US009836757B2

(12) United States Patent
Ho (10) Patent No.: US 9,836,757 B2
(45) Date of Patent: Dec. 5, 2017

(54) DATA VISUALIZATION METHOD AND DATA VISUALIZATION DEVICE

(71) Applicant: Industrial Technology Research Institute, Hsinchu (TW)

(72) Inventor: Tan-Chi Ho, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 6 days.

(21) Appl. No.: 15/130,528

(22) Filed: Apr. 15, 2016

(65) Prior Publication Data
US 2017/0169442 A1  Jun. 15, 2017

(30) Foreign Application Priority Data

Dec. 11, 2015 (TW) .............................. 104141828 A (51) Int. Cl.
G06Q 30/02 (2012.01)
G06T 11/00 (2006.01)
G06T 11/20 (2006.01)

(52) U.S. Cl.
CPC ........ G06Q 30/0201 (2013.01); G06T 11/001 (2013.01); G06T 11/206 (2013.01)

(58) Field of Classification Search
CPC . G06T 11/001; G06T 11/206; G06Q 30/0201; G06F 17/30601; G06F 17/30713; G06F 17/30716; G06F 19/26
See application file for complete search history.

(56) References Cited

U.S. PATENT DOCUMENTS 6,711,577 B1  3/2004  Wong
6,982,708 B1  1/2006  Mah
(Continued)

FOREIGN PATENT DOCUMENTS

CN     102254265    11/2011
CN     103138986     6/2013
(Continued)

OTHER PUBLICATIONS

Zeqian Shen , Jishang Wei , Kwan-Liu Ma , Neel Sundaresan, Visual cluster exploration of web clickstream data, Proceedings of the 2012 IEEE Conference on Visual Analytics Science and Technology (VAST), p. 3-12, Oct. 14-19, 2012 [doi>10.1109/VAST.2012.6400494].*
(Continued)

Primary Examiner — Antonio A Caschera
(74) Attorney, Agent, or Firm — Nixon Peabody LLP (57) ABSTRACT

A data visualization method and a data visualization device. The data visualization method includes the following steps: capturing a clickstream that includes a plurality of click data; generating a similarity value for each of the plurality of click data by comparing a first sequential segment of each of the plurality of click data with a segment pattern; capturing the click data having the maximum similarity among the plurality of click data and capturing a second sequence segment of each of the click data having the maximum similarity; visualizing the second sequential segments in a 2D space to present the visualized sequence data of each of the second sequence segments, and setting a position of the click data, having the maximum similarity, in the visualized sequence data to be at a datum point in a first dimension of the 2D space.

22 Claims, 9 Drawing Sheets
(2 of 9 Drawing Sheet(s) Filed in Color)

(56) References Cited

U.S. PATENT DOCUMENTS

| | | |
|---|---|---|
| 6,996,536 B1 | 2/2006 | Cofino |
| 7,266,510 B1 | 9/2007 | Cofino |
| 7,278,105 B1 | 10/2007 | Kitts |
| 7,539,677 B1 | 5/2009 | Wong |
| 8,533,825 B1 * | 9/2013 | Marsa ................ H04L 63/1425 726/22 |
| 2012/0197896 A1 | 8/2012 | Li |
| 2013/0253907 A1 | 9/2013 | Castellanos |
| 2013/0268468 A1 | 10/2013 | Vijayaraghavan |
| 2014/0096056 A1 | 4/2014 | Latzina |
| 2014/0101580 A1 | 4/2014 | Shen |
| 2014/0108426 A1 | 4/2014 | Goldberg |

FOREIGN PATENT DOCUMENTS

| | | |
|---|---|---|
| TW | 201031162 A | 8/2010 |
| TW | 201405464 | 2/2014 |

OTHER PUBLICATIONS

Office Action issued by TIPO dated Jul. 7, 2016—Application No. 104141828.

* cited by examiner

DATA VISUALIZATION METHOD AND DATA VISUALIZATION DEVICE

CROSS-REFERENCE TO RELATED APPLICATIONS

This non-provisional application claims priority under 35 U.S.C. §119(a) on Patent Application No(s). 104141828 filed in Taiwan, R.O.C. on Dec. 11, 2015, the entire contents of which are hereby incorporated by reference.

TECHNICAL FIELD

The disclosure relates to a data visualization method and a data visualization device.

BACKGROUND

The development of technology has brought in a high-quality and high-speed network communication, and a variety of electronic devices having a network assessing function is being innovated. Therefore, over the years, the market transaction amount in the e-commerce has greatly grown up, and then a great deal of relevant firms has deployed their markets in the e-commerce.

However, these firms also face a challenge to the accurate handling of the customer's tendency in the e-commerce. For example, modern methods used in the art include: gathering statistics of hot produces, gathering statistics of the distribution of customers (including time and positions), calculating the conversion rate in a preset goal stage, analyzing the effect of a specific promotion activity, etc. These modern methods cannot accurately survey the customer's behavior yet.

In addition, modern methods of web analytics usually compute statistics of a complete clickstream. The complete clickstream, however, may have many data sections about a user's actions. For example, users may browse the contents of web pages purposelessly, compare products, purchase products, or edit their member information. Therefore, the complete clickstream may have a great deal of useless contents. Moreover, a behavior model frequently appearing in the complete clickstream does not mean that it is more useful.

Accordingly, it actually requires specialists in data scientist to check the contents of the complete clickstream one by one, so as to find out a more useful behavior model. This conventional way greatly depends on human experiences and thus, has a relatively low efficiency.

SUMMARY

According to one or more embodiments, the disclosure provides a data visualization method including the following steps. Capture a clickstream, which includes a plurality of click data. Compare a segment pattern with a first sequence segment of each piece of the click data to generate a similarity for each piece of the click data. Capture more than one piece of click data having the maximum similarity, and capture a second sequence segment of each piece of click data having the maximum similarity. Visualize the second sequence segments in a two-dimensional (2D) space, in which the visualized sequence data of each of the second sequence segments is presented and a position of each piece of the click data having the maximum similarity in the visualized sequence data is mapped to a datum point in a first dimension of the 2D space. The first dimension of the 2D space is related to an order of the plurality of click data, and a second dimension of the 2D space is related to an event status of each piece of the click data.

According to one or more embodiments, the disclosure also provides a data visualization device including a data capturing module, a similarity determination module and a visualization module. The similarity determination module is coupled to the data capturing module, and the visualization module is coupled to the data capturing module and the similarity determination module. The data capturing module captures a clickstream including a plurality of click data. The similarity determination module compares a segment pattern with a first sequence segment of each piece of the click data to generate a similarity of each piece of the click data. The visualization module captures more than one piece of the click data having the maximum similarity among the plurality of click data and captures a second sequence segment of each piece of the click data having the maximum similarity. The visualization module also visualizes the second sequence segments in a 2D space, in which the visualized sequence data of each of the second sequence segments is presented and a position of each piece of the click data having the maximum similarity in the visualized sequence data is set at a datum point in a first dimension of the 2D space. The first dimension of the 2D space is related to an order of the plurality of click data, and a second dimension of the 2D space is related to an event status of each piece of the click data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
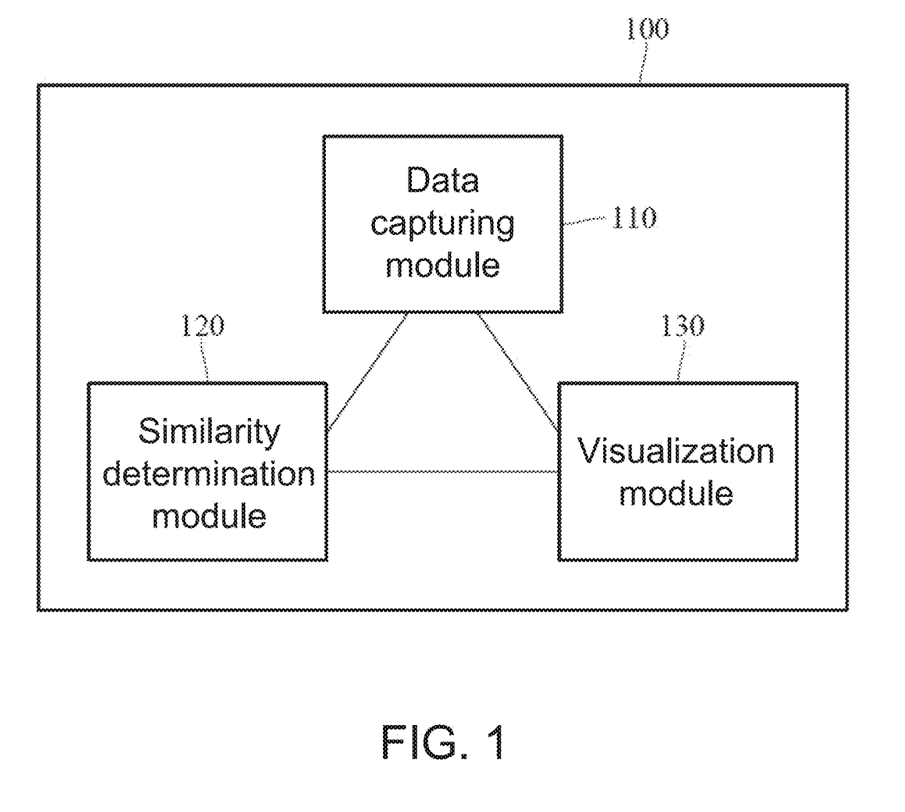
FIG. 1 is a block diagram of a data visualization device in an embodiment.
Figure 2:
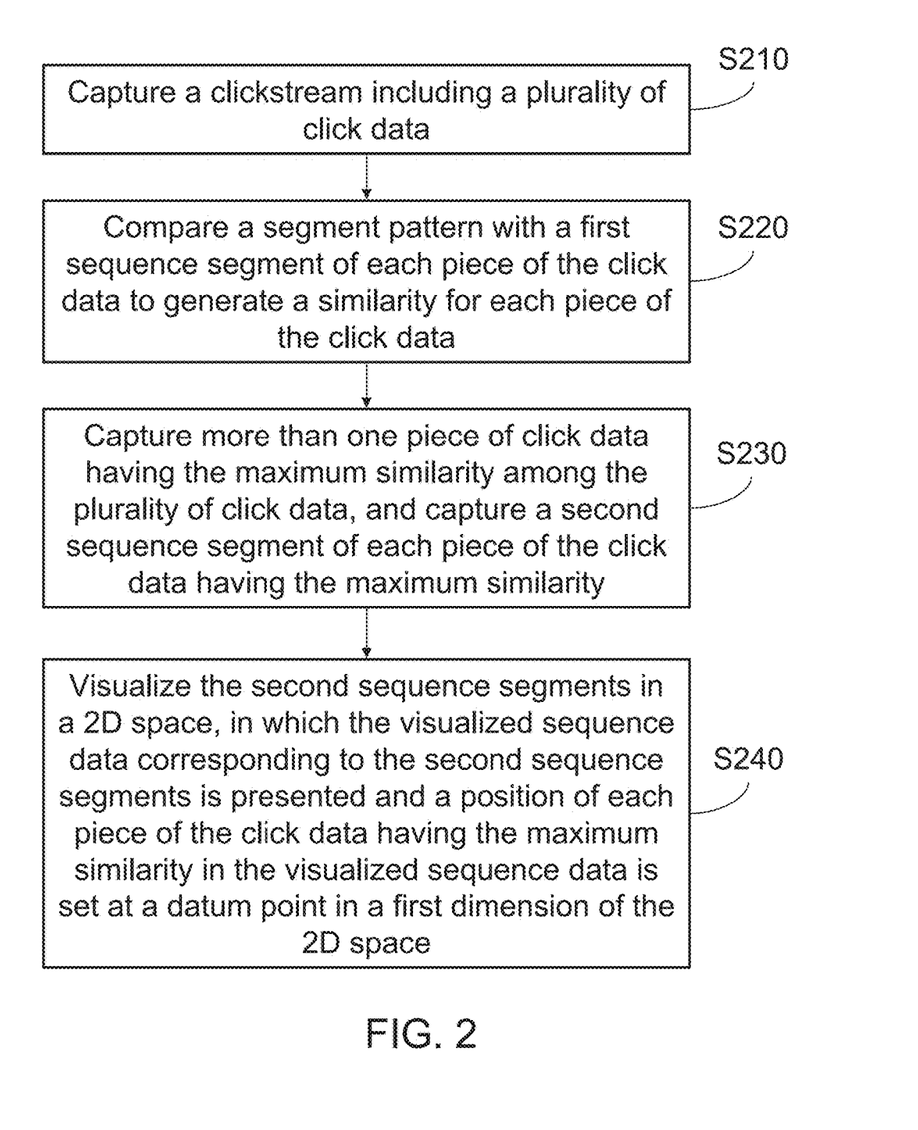
FIG. 2 is a flow chart of a data visualization method in an embodiment.

FIG. 1 is a block diagram of a data visualization device 100 in an embodiment. As shown in FIG. 1, the data visualization device 100 includes a data capturing module 110, a similarity determination module 120, and a visualization module 130. The similarity determination module 120 is coupled to the data capturing module 110, and the visualization module 130 is coupled to the data capturing module 110 and the similarity determination module 120. FIG. 2 is a flow chart of a data visualization method in an embodiment. As shown in FIG. 2, the data visualization method includes steps S210~S240. The following description relate to FIG. 1 and FIG. 2.

For example, the data visualization device 100 is, but not limited to, a personal computer, a portable electronic device, a cloud server or another electronic device with a computing function. For example, the data capturing module 110, the similarity determination module 120 and the visualization module 130 are carried out by varieties of chips or microprocessors, and the disclosure will not be limited thereto.

In step S210, the data capturing module 110 captures a clickstream that includes multiple click data. In this embodiment, the data capturing module 110 may capture the clickstream from a weblog. For example, the clickstream is the sequential data based on a user's clicking on a specific shopping website, and each click action corresponds to one piece of click data.

In step S220, the similarity determination module 120 compares a segment pattern with a first sequence segment of each click data to generate a similarity for each click data. The first sequence segment is one part of the clickstream.

Generally, the above segment pattern is preset sequential data having a specific order, and is used to represent a series of preset clicks done on the shopping website by the user. In this embodiment, the similarity determination module 120 sets the data related to a click (referred to as one piece of click data) and the data related to the n1 sequential pieces of following click to be the first sequence segment, and n1 is a positive integer. In another embodiment, the similarity determination module 120 sets the data related to a click, the data related to the n2 sequential pieces of previous click, and the data related to the n3 sequential pieces of following clicks to be the first sequence segment, and n2 and n3 are positive integers. The disclosure is not restricted to the above instances of the first sequence segment. Moreover, the length of the first sequence segment may be equal to the length of the segment pattern, so as to analyze the similarity between the first sequence segment and the segment pattern.

In this embodiment, the similarity determination module 120 performs a sliding window method to the above clickstream to in turn capture the first sequence segment of each click data, and the similarity between each first sequence segment and the segment pattern. A window length used in the sliding window method is equal to a segment length of the segment pattern. In other words, each click data is the first piece of data corresponding to the window, and each first sequence segment is the entire data covered by the related sliding window.

For example, when one piece of indicated click data and the 4 sequential pieces of following click data absolutely match the segment pattern, the similarity for the indicated click data is 1; when one piece of indicated click data and the 4 sequential pieces of following click data don't absolutely match the segment pattern, the similarity for the indicated click data is 0; and if the comparison indicates partial matching, the similarity is between 0 and 1. This will be described in detail below with respect to the figures.

Figure 3:
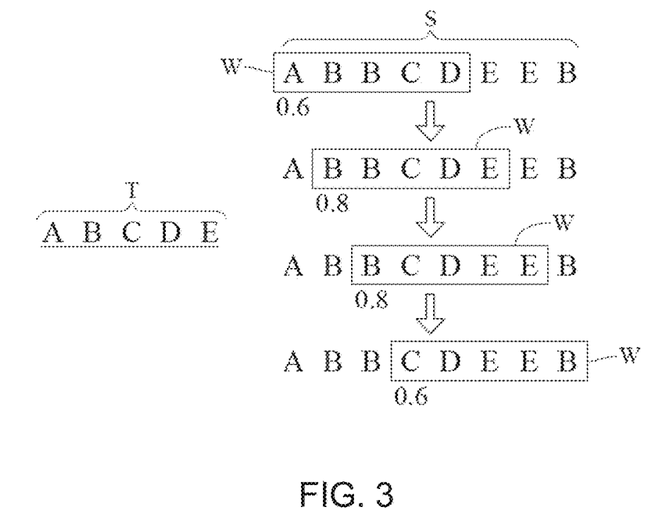
FIG. 3 is a schematic view of the sliding window method in an embodiment.

FIG. 3 is a schematic view of the sliding window method in an embodiment. As shown in FIG. 3, the segment pattern T1 is ABCDE, and A, B, C, D and E represent different event statuses, respectively; the clickstream S is ABBCDEEB; and the length of the sliding window and the length of the segment pattern T1 are 5, and the sliding windows W corresponding to the front 4 pieces of click data, i.e. A, B, B and C, in the clickstream S are ABBCD, BBCDE, BCDEE and CDEEB, respectively. In this case, the matched parts of the sliding windows W as compared to the segment pattern T1 are BCD, BCDE, BCDE and CDE, respectively and thus, have similarities of 0.6, 0.8, 0.8 and 0.6 with respect to the segment pattern T1, respectively.

In step S230, the visualization module 130 captures more than one piece of click data having the maximum similarity, and captures a second sequence segment of each piece of click data having the maximum similarity. Each of the second sequence segments is one part of the clickstream.

In this embodiment, the visualization module 130 may set a piece of click data, the n4 sequential pieces of previous click data and the n5 sequential pieces of following click data to be second sequence segments, and n4 and n5 are positive integers. In a second sequence segment, only one piece of click data having the maximum similarity is included. n4 and n5 are set according to actual requirements, that is, the length of the second sequence segment is set according to actual requirements.

In another embodiment, the more than one piece of click data having the maximum similarity may be boundary points used to divide the clickstream into multiple second sequence segments. In detail, a second sequence segment includes a single piece of click data having the maximum similarity, multiple sequential pieces of previous click data, and multiple sequential pieces of following click data. The multiple sequential pieces of click data previous to the single click data having the maximum similarity may forwardly cover one piece of click data following another piece of click data having the maximum similarity. Similarly, the multiple sequential pieces of click data following the single click data having the maximum similarity may backwardly cover one piece of click data previous to yet another piece of click data having the maximum similarity.

In step S240, the visualization module 130 visualizes all second sequence segments in a 2D space to present multiple pieces of visualized sequence data corresponding to the second sequence segments in the 2D space respectively, and a position, related to the click data having the maximum similarity, in each piece of visualized sequence data corresponds to a datum point in the first dimension. In this embodiment, the first dimension of the 2D space is related to a relevant order of multiple pieces of click data, and the second dimension of the 2D space is related to an event status of each piece of click data.

In this embodiment, each piece of the above visualized sequence data is one point in the 2D space. For example, these points have their own coordinates (x, y), x indicates the first dimension X, and y indicates the second dimension Y. In other words, each point in the 2D space represents one piece of click data, x indicates the ranking of the click data, and y indicates the event status of the click data.

For instance, after steps S210~S240 are performed, it may be benefited from the visualized sequence data near the datum point in the 2D space to synthetically present that a user did a series of clicks, which matches the segment pattern the most, on a specific shopping website and present that the user did other clicks previous or next to this series of clicks. In other words, the above visualized sequence data in the 2D space may clearly present which other possible variability exists. The related operation will be described in detail later.

Figure 4:
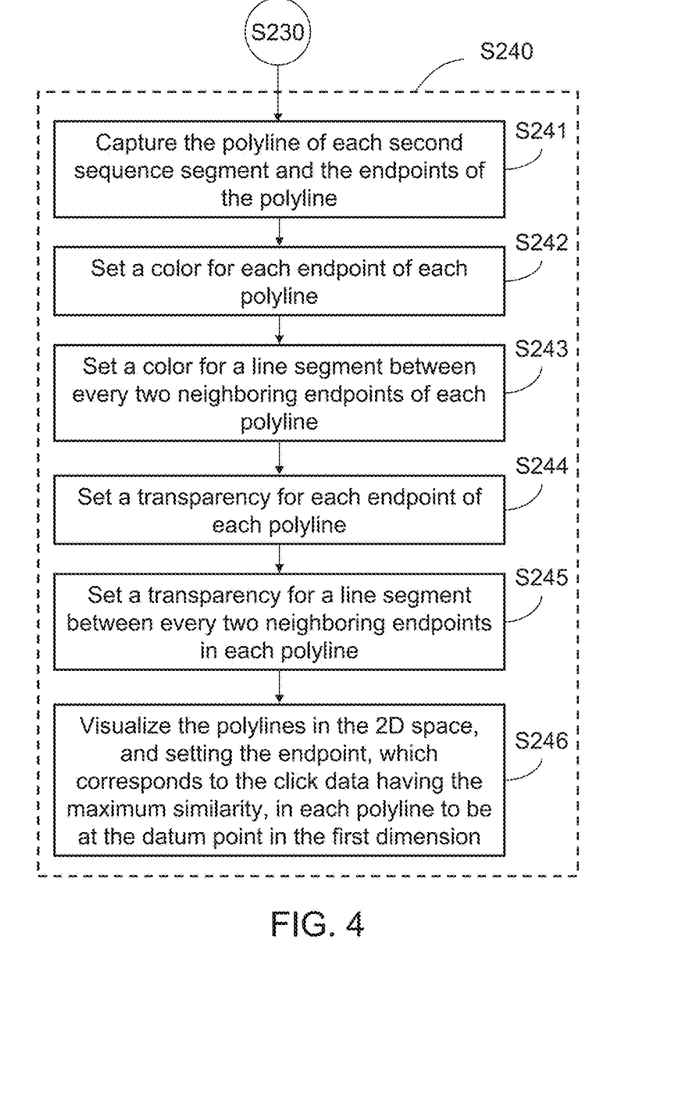
FIG. 4 is a flow chart of a data visualization method in another embodiment.

FIG. 4 is a flow chart of a data visualization method in another embodiment. As shown in FIG. 4, in this embodiment, step S240 includes steps S241~S246.

Figure 5:
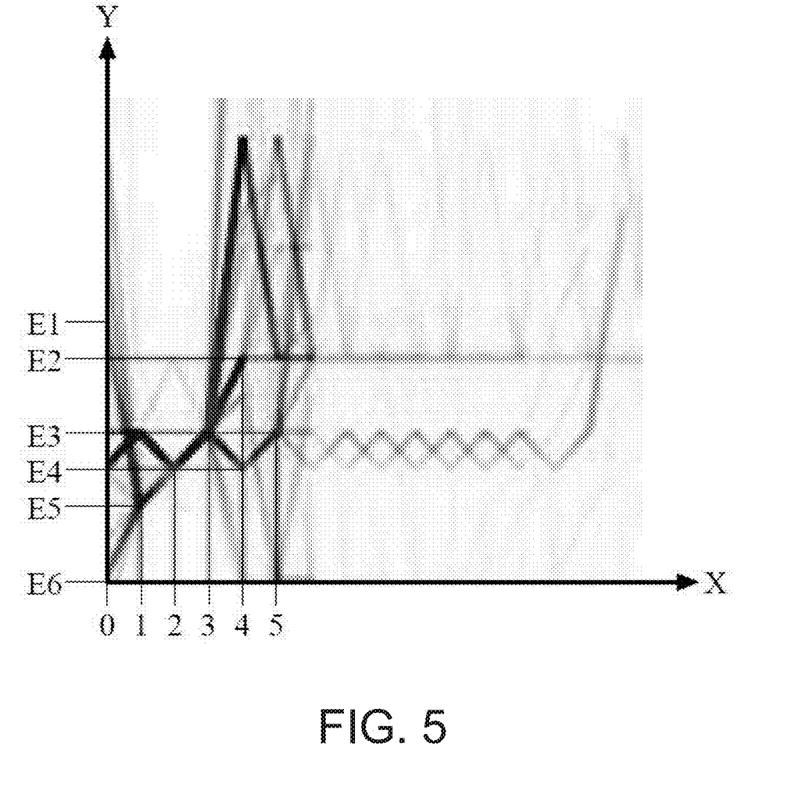
FIG. 5 is a schematic view of visualizing polylines in the 2D space in accordance with a clickstream in an embodiment.
Figure 6:
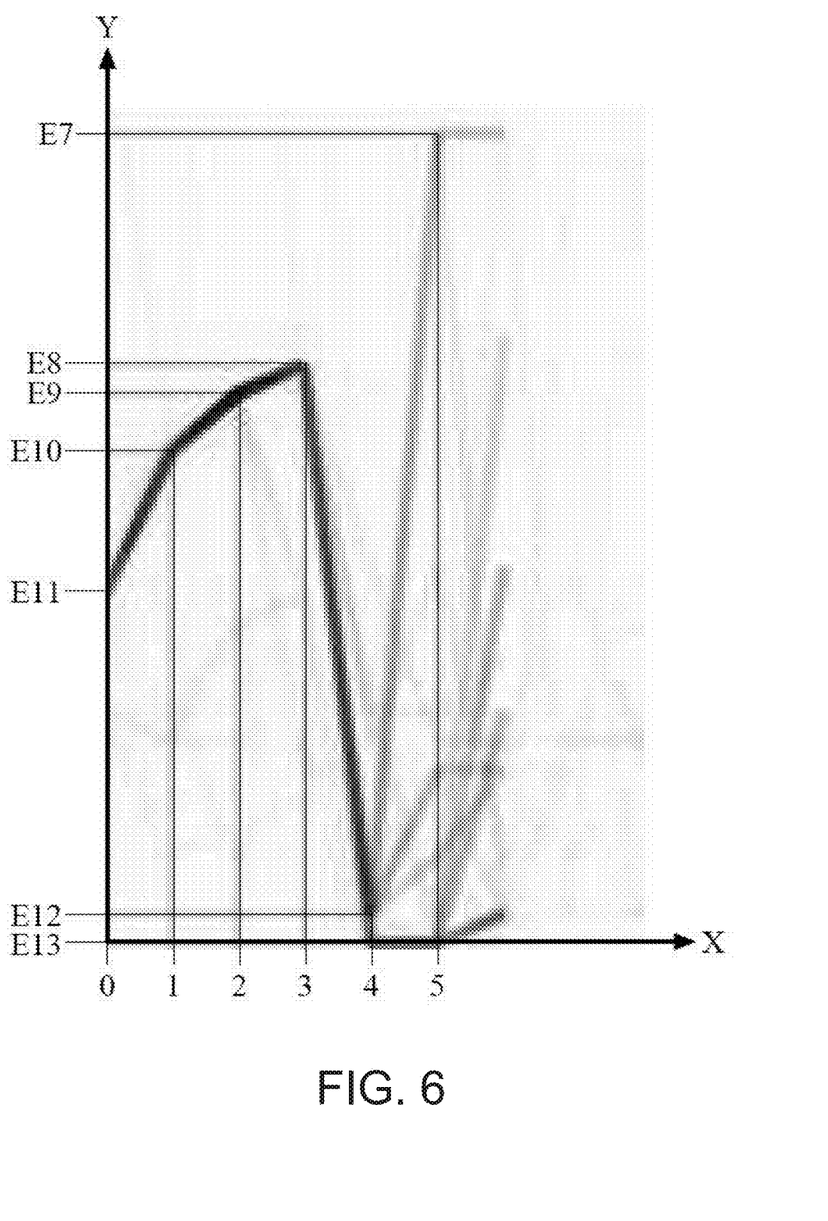
FIG. 6 is a schematic view of visualizing polylines in the 2D space in accordance with another clickstream in an embodiment.

FIG. 5 is a schematic view of visualizing polylines in the 2D space in accordance with a clickstream in an embodiment. FIG. 6 is a schematic view of visualizing polylines in the 2D space in accordance with another clickstream in another embodiment. As shown in FIG. 5, in this embodiment, various event statuses E1~E6 are presented in the second dimension of the 2D space. As shown in FIG. 6, various event statuses E7~E13 are presented in this embodiment, the second dimension of the 2D space. The data visualization method is described in detail below with respect to FIG. 1, FIG. 2, FIG. 4, FIG. 5 and FIG. 6.

In step S241, the visualization module 130 further captures the polylines corresponding to the second sequence segments and the endpoints of each of the polylines, and each of the endpoints corresponds to one piece of click data. For example, it is similar to the above embodiment that each of the endpoints has its own coordinate (x, y), x indicates the first dimension, and y indicates the second dimension. That is, each point in the 2D space represents one piece of click data, x is the ranking of the click data, and y represents the event status of the click data.

In step S242, the visualization module 130 further sets a color for each endpoint of each polyline. In this embodiment, the color of each endpoint of each polyline is related to the event status of the related click data; the endpoints at the same position in the second dimension have the same color; and the endpoints at different positions in the second dimension have different colors, respectively. As shown in FIG. 5, the event statuses E1~E6 correspond to different colors, respectively. As shown in FIG. 6, the event statuses E7~E13 correspond to different colors, respectively.

In step S243, the visualization module 130 further sets a color for the line segment between every two neighboring endpoints of each polyline. In this embodiment, the color of the line segment between every two neighboring endpoints of each polyline is a mixed color of the colors of the two neighboring endpoints. In another embodiment, the color of a part of the line segment between the two neighboring endpoints is more similar to the color of one of the two neighboring endpoints when being closer to this endpoint, but the color of this part of the line segment is more unlike to the other one of the two neighboring endpoints.

For instance, when two neighboring endpoints of a line segment in a polyline are red and yellow, respectively, the color of this line segment is substantially a mixed color (i.e. orange) of red and yellow. When a part of the line segment is closer to the red endpoint, this part may be more reddish orange; and when a part of the line segment is closer to the yellow endpoint, this part may be more yellowish orange.

In step S244, the visualization module 130 further sets a transparency for each endpoint of each polyline. In this embodiment, the transparency of each endpoint of each polyline is related to the similarity of the related click data. When the similarity corresponding to an endpoint is higher, the transparency of this endpoint is smaller. That is, if a certain endpoint is more opaque, it indicates that this endpoint corresponds to a higher similarity. Alternatively, more important data is presented by a more opaque color in the 2D space.

In an embodiment, the transparency of an endpoint is presented by an alpha channel in a RGBA color space or by a HSV color space. In the HSV color space, the color of an endpoint and the color of a line segment are represented by hues, and the transparency of an endpoint and the transparency of a line segment are represented by saturations or values (also known as brightness). For example, the transparency of a line segment between every two neighboring endpoints in each of the polylines is obtained by performing an interpolation operation to the transparencies of the two neighboring endpoints by the visualization module; and the transparency of the line segment between every two neighboring endpoints in each of the polylines is an interpolation value of the transparencies of the two neighboring endpoints. For example, when a certain endpoint is more opaque, the saturation or value of this endpoint is higher; and when a certain endpoint is more transparent, the saturation or value of this endpoint is lower. In another embodiment, the transparency of an endpoint may be presented by another visualization method, and the disclosure is not restricted to the above embodiment.

In step S245, the visualization module 130 further sets a transparency for the line segment between every two neighboring endpoints of each polyline. In this embodiment, the transparency of the line segment between every two neighboring endpoints of each polyline is an interpolation of the transparencies of the two neighboring endpoints. Specifically, the transparency of the line segment between every two neighboring endpoints of each polyline is a linear interpolation of the transparencies of the two neighboring endpoints.

In step S246, the visualization module 130 further visualizes all polylines in the 2D space in turn and aims the endpoint, corresponding to the click data having the maximum similarity, of each polyline at a datum point in the first dimension. Alternatively, the endpoint, corresponding to the click data having the maximum similarity, in each polyline aims at a datum line in the 2D space. For example, in this embodiment, as shown in FIG. 5 and FIG. 6, the endpoints, corresponding to the click data having the maximum similarity, of all the polylines aim at the datum line (i.e. x=0).

Moreover, after the color and transparency of each endpoint and the color and transparency of each line segment are set in the above steps, the visualization module 130 converts them into an endpoint value and a line segment value, respectively. During the visualization process, one or more endpoint values or one or more line segment values at a related position in the 2D space are accumulated in turn. For example, when more than one endpoint is located at the same position, an accumulation value at this position is obtained by in turn accumulating the endpoint values related to this position.

Therefore, when the visualization module 130 is visualizing each polyline in the 2D space in respect to the datum line (x=0), a portion having a relatively high frequency and a portion having a relatively high similarity may be highlighted in the 2D space in accordance with the relatively opaque line segments in polylines and the accumulation of more polylines, as shown in FIGS. 5 and 6. Generally, a polyline, which is relatively opaque, indicates that a rate of a segment pattern appearing in the clickstream is relatively high, and a different degree of transparency represents a different rate of a segment pattern appearing in the clickstream.

Figure 7A:
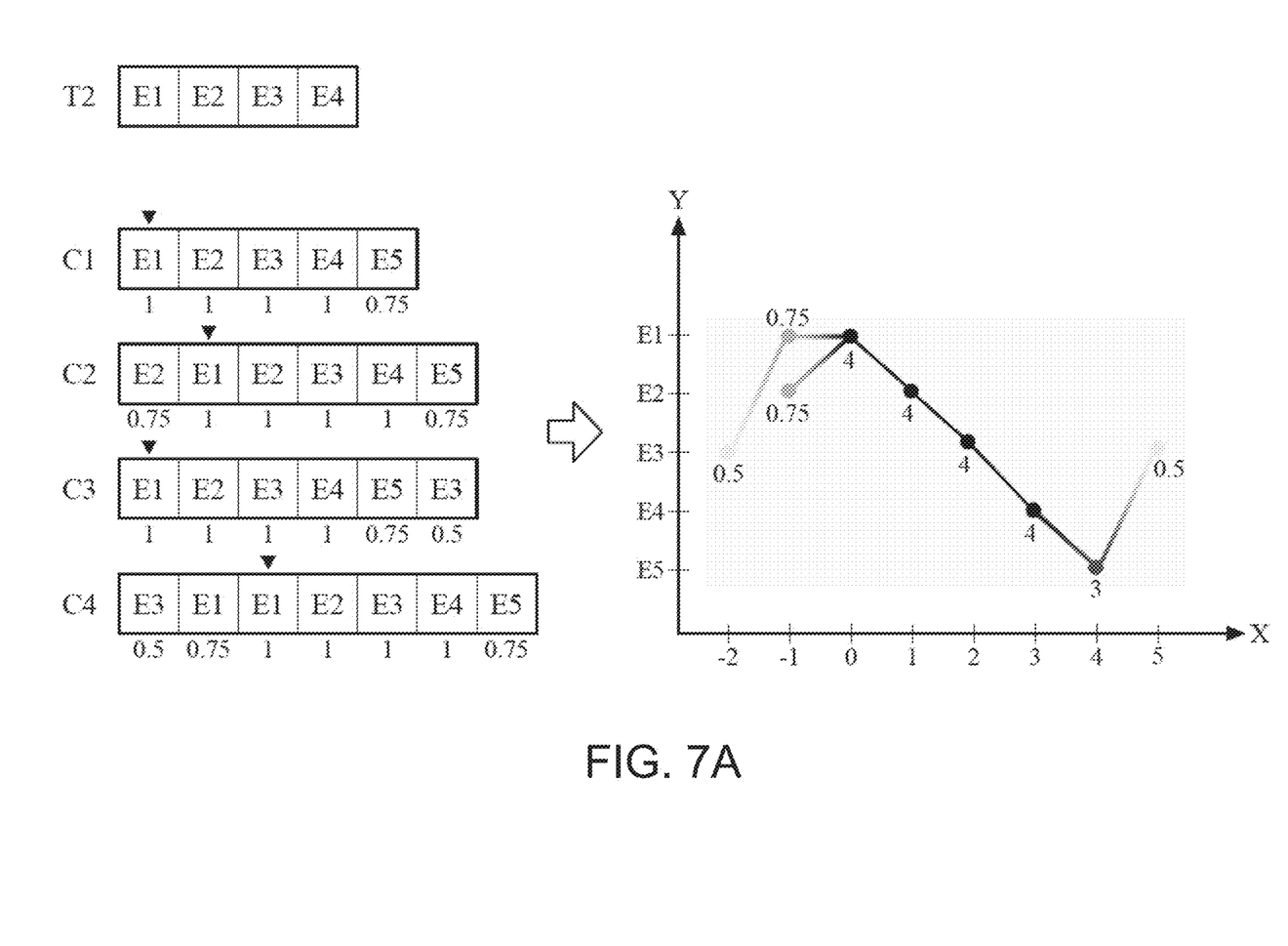
FIGS. 7A~7C are schematic views of visualizing the second sequence segments in the two-dimensional space in another embodiment.
Figure 7B:
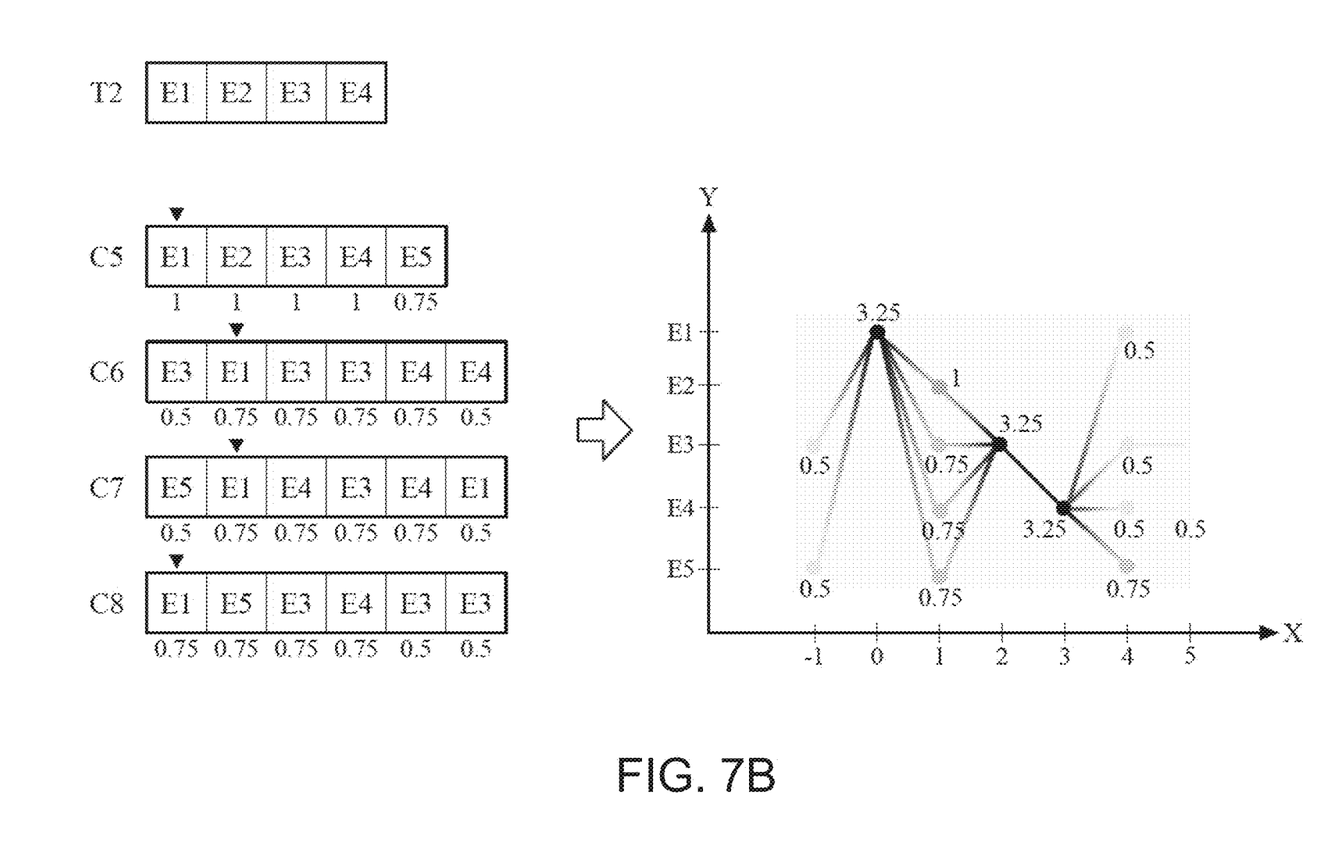
Figure 7C:
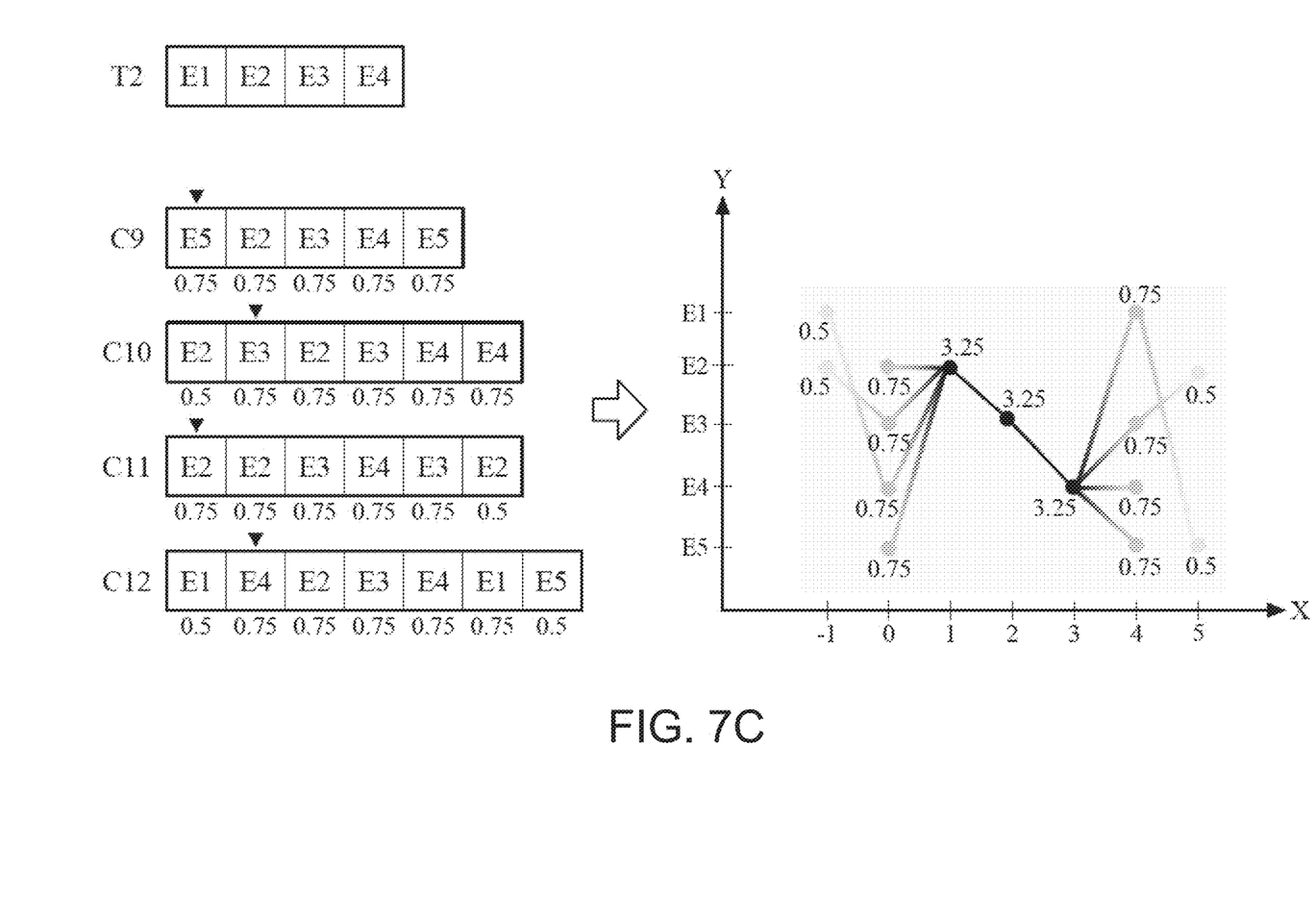

FIGS. 7A~7C are schematic views of visualizing the second sequence segments in the two-dimensional space in another embodiment. In this embodiment, the event status E1~E5 are presented in the second dimension of the 2D space, the segment pattern T2 has E1, E2, E3 and E4 arranged in order, and the length of the sliding window and the length of the segment pattern are 4. As shown in FIGS. 7A~7C, the similarity corresponding to the click data in each of the second sequence segments C1~C12 is calculated, and the position corresponding to the click data (e.g. the click data corresponding to the event status E1 herein) having the maximum similarity is set at the datum point (i.e. X=0) in the first dimension. Moreover, if more than one piece of click data is visualized at the same point in the 2D space, the similarity at this point may be accumulated.

As shown in FIG. 7A, the second sequence segments C1~C4 are captured from the clickstream. In this embodiment with respect to FIG. 7A, the real sequence appearance (from X=−2 to X=5) in the 2D space may be longer than a given segment pattern. In other words, other event statuses may be presented where X=−2, X=−1, X=4 and X=5.

In FIG. 7B, the second sequence segments C5~C8 are captured from the clickstream. In this embodiment with respect to FIG. 7B, the real sequence appearance in the 2D space may be longer than a given segment pattern (from X=−1 to X=5) and have a variability therein. That is, another event status may also be presented where X=1.

In FIG. 7C, the second sequence segments C9~C12 are captured from the clickstream. In this embodiment with respect to FIG. 7C, the real sequence appearance (from X=1 to X=3) in the 2D space may be shorter than a given segment pattern.

As set forth above, the disclosure captures a clickstream from a weblog and compares the clickstream with a segment pattern through the sliding window method to generate a similarity for each piece of click data. Moreover, more than one piece of click data having the maximum similarity and the second sequence segments corresponding to these pieces of click data having the maximum similarity are captured, so as to visualize all second sequence segments in a 2D space and to aim each piece of visualized sequence data at a datum point in the first dimension of the 2D space during the visualization process. Therefore, this 2D space may automatically present the real sequence appearance of a given segment pattern in the clickstream and also present other possible variability, and then data scientists may learn of the actions indicated by the sequence.

What is claimed is:

1. A data visualization method performed by an electronic device with a computing function, comprising:
    capturing, via a data capturing module, a clickstream, which comprises a plurality of click data;
    comparing, via a similarity determination module, a segment pattern with a first sequence segment of each piece of the click data to generate a similarity for each piece of the click data;
    capturing, via a visualization module, more than one piece of click data having the maximum similarity among the plurality of click data, and capturing, via the visualization module, a second sequence segment of each piece of the click data having the maximum similarity; and
    visualizing, via the visualization module, the second sequence segments in a two-dimensional (2D) space in which visualized sequence data corresponding to the second sequence segments is presented and a position of each piece of the click data having the maximum similarity in the visualized sequence data is set at a datum point in a first dimension of the 2D space;
    wherein the first dimension of the 2D space is related to an order of plurality of click data, and a second dimension of the 2D space is related to an event status of each piece of the click data.

2. The data visualization method according to claim 1, wherein each piece of the visualized sequence data represents a polyline having a plurality of endpoints, and each of the plurality of endpoints corresponds to one piece of the click data; and
    visualizing the second sequence segments in the 2D space comprises:
        capturing the polyline of each of the second sequence segments and capturing the plurality of endpoints of the polyline; and
        visualizing each of the polylines in the 2D space, and setting the endpoint, which corresponds to the click data having the maximum similarity, in each of the polylines to be at the datum point in the first dimension.

3. The data visualization method according to claim 2, wherein capturing the polyline of each of the second sequence segments comprises:
    setting a transparency for each of the endpoints of each of the polylines;
    wherein the transparency of the endpoint is related to the similarity of the click data related to the endpoint.

4. The data visualization method according to claim 3, wherein when the similarity of the endpoint is relatively high, the transparency of the endpoint is relatively low.

5. The data visualization method according to claim 4, wherein capturing the polyline of each of the second sequence segments further comprises:
    setting a transparency for a line segment between every two neighboring endpoints in each of the polylines;
    wherein the transparency of the line segment between every two neighboring endpoints in each of the polylines is an interpolation value of the transparencies of the two neighboring endpoints.

6. The data visualization method according to claim 2, wherein capturing the polyline of each of the second sequence segments comprises:
    setting a color for each of the endpoints of each of the polylines;
    wherein the color of each the endpoints of each of the polylines is related to the event status of the click data related to the endpoint.

7. The data visualization method according to claim 6, wherein the colors of the endpoints at a same position in the second dimension are the same.

8. The data visualization method according to claim 7, wherein the colors of the endpoints at different positions in the second dimension are different.

9. The data visualization method according to claim 8, wherein capturing the polyline of each of the second sequence segments further comprises:
    setting a color for a line segment between every two neighboring endpoints of each of the polylines;
    wherein the color of the line segment between every two neighboring endpoints of each of the polylines is a mixed color of the colors of the two neighboring endpoints.

10. The data visualization method according to claim 1, wherein capturing the clickstream comprises:
    capturing the clickstream from a weblog.

11. The data visualization method according to claim 1, wherein comparing the segment pattern with the first sequence segment of each piece of the click data to obtain the similarity of each piece of the click data:

performing a sliding window method to the clickstream to one by one capture the first sequence segments of the plurality of click data and capture the similarity between the first sequence segment and the segment pattern, wherein a window length used in the sliding window method is equal to a segment length of the segment pattern.

12. A data visualization device, comprising:
a data capturing module for capturing a clickstream comprising a plurality of click data;
a similarity determination module coupled to the data capturing module, for comparing a segment pattern with a first sequence segment of each of the plurality of click data to generate a similarity for each of the plurality of click data;
a visualization module coupled to the data capturing module and the similarity determination module, for capturing more than one piece of click data that has the maximum similarity, and a second sequence segment of each piece of click data that has the maximum similarity, and for visualizing the second sequence segments in a 2D space in which visualized sequence data corresponding to the second sequence segments is presented and a position of each piece of the click data having the maximum similarity in the visualized sequence data is set at a datum point in a first dimension of the 2D space;
wherein the first dimension of the 2D space is related to an order of plurality of click data, and a second dimension of the 2D space is related to an event status of each piece of the click data.

13. The data visualization device according to claim 12, wherein each piece of the visualized sequence data represents a polyline having a plurality of endpoints, and each of the plurality of endpoints corresponds to one piece of the click data; the visualization module further captures the polyline, of each of the second sequence segments, and the endpoints of the polyline, visualizes the polylines in the 2D space one by one, and sets the endpoint, corresponding to the click data having the maximum similarity, in each of the polylines to be at the datum point in the first dimension.

14. The data visualization device according to claim 13, wherein each of the endpoints of each of the polylines has a transparency, which is calculated by the visualization module according to the similarity of the click data related to the endpoint.

15. The data visualization device according to claim 14, wherein when the similarity of the endpoint is relatively high, the transparency of the endpoint is relatively low.

16. The data visualization device according to claim 15, wherein a line segment between every two neighboring endpoints in each of the polylines has a transparency, which is obtained by performing an interpolation operation to the transparencies of the two neighboring endpoints by the visualization module.

17. The data visualization device according to claim 13, wherein each endpoint of each of the polylines has a color, which is related to the event status of the click data related to the endpoint.

18. The data visualization device according to claim 17, wherein the colors of the endpoints at a same position in the second dimension are the same.

19. The data visualization device according to claim 18, wherein the colors of the endpoints at different positions in the second dimension are different.

20. The data visualization device according to claim 19, wherein a line segment between every two neighboring endpoints of each of the polylines has a color, which is a mixed color of the colors of the two neighboring endpoints.

21. The data visualization device according to claim 12, wherein the data capturing module further captures the clickstream from a weblog.

22. The data visualization device according to claim 12, wherein the similarity determination module further performs a sliding window method to the clickstream to one by one capture the first sequence segments corresponding to the plurality of click data, and the similarity between the first sequence segment and the segment pattern; and a window length used in the sliding window method is equal to a segment length of the segment pattern.

* * * * *